(12) United States Patent
Xu

(10) Patent No.: US 7,973,122 B2
(45) Date of Patent: Jul. 5, 2011

(54) POLYAMIDEIMIDE COMPOSITIONS HAVING MULTIFUNCTIONAL CORE STRUCTURES

(75) Inventor: James J. Xu, Ft. Wayne, IN (US)

(73) Assignee: General Cable Technologies Corporation, Highland Heights, KY (US)

( * ) Notice: Subject to any disclaimer, the term of this patent is extended or adjusted under 35 U.S.C. 154(b) by 775 days.

(21) Appl. No.: 11/153,986

(22) Filed: Jun. 16, 2005

(65) Prior Publication Data

US 2005/0282010 A1 Dec. 22, 2005

Related U.S. Application Data

(60) Provisional application No. 60/580,457, filed on Jun. 17, 2004.

(51) Int. Cl.
*C08G 18/00* (2006.01)
(52) U.S. Cl. .......................... 528/59; 524/590; 428/375
(58) Field of Classification Search .................. 528/59; 524/90; 428/375
See application file for complete search history.

(56) References Cited

U.S. PATENT DOCUMENTS

| | | | |
|---|---|---|---|
| 3,592,789 A | 7/1971 | Bolton | |
| 3,615,913 A | 10/1971 | Shaw | |
| 3,937,673 A | 2/1976 | Koerner et al. | |
| 4,061,623 A | 12/1977 | Onder | |
| 4,094,864 A | 6/1978 | Onder | |
| 4,340,697 A | 7/1982 | Aya et al. | |
| 4,342,814 A | 8/1982 | Usuki et al. | |
| 4,350,738 A | 9/1982 | Saunders et al. | |
| 4,374,221 A | 2/1983 | McGregor et al. | |
| 4,377,652 A | 3/1983 | Ohmura et al. | |
| 4,405,687 A | 9/1983 | Morita et al. | |
| 4,426,423 A | 1/1984 | Intrater et al. | |
| 4,476,192 A | 10/1984 | Imai et al. | |
| 4,477,624 A * | 10/1984 | Waki .............................. | 524/736 |
| 4,503,124 A | 3/1985 | Keane et al. | |
| 4,563,369 A | 1/1986 | Lavallee | |
| 4,693,936 A | 9/1987 | McGregor et al. | |
| 4,716,079 A | 12/1987 | Sano et al. | |
| 4,738,990 A * | 4/1988 | Nelb et al. ..................... | 521/108 |
| 4,902,767 A | 2/1990 | Roitman et al. | |
| 4,935,302 A | 6/1990 | Hjortsberg et al. | |
| 5,066,513 A | 11/1991 | Zurecki et al. | |
| 5,209,987 A | 5/1993 | Penneck et al. | |
| 5,219,657 A * | 6/1993 | Ueoka et al. .................. | 428/379 |
| 5,221,707 A | 6/1993 | Chihara et al. | |
| 5,296,260 A | 3/1994 | Sawada et al. | |
| 5,310,850 A | 5/1994 | Chen et al. | |
| 5,350,638 A | 9/1994 | Sawada et al. | |
| 5,356,708 A | 10/1994 | Matsuura et al. | |
| 5,393,612 A | 2/1995 | Matsuura et al. | |
| 5,425,992 A | 6/1995 | Tachikawa et al. | |
| 5,443,905 A | 8/1995 | Sawada et al. | |
| 5,514,747 A | 5/1996 | Hsu et al. | |
| 5,602,213 A | 2/1997 | Hsu et al. | |
| 5,654,095 A | 8/1997 | Yin et al. | |
| 5,770,673 A | 6/1998 | Markusch et al. | |
| 5,861,578 A | 1/1999 | Hake et al. | |
| 5,902,681 A | 5/1999 | Ueoka et al. | |
| 5,942,473 A | 8/1999 | Knerr et al. | |
| 6,056,995 A * | 5/2000 | Hake et al. ..................... | 427/118 |
| 6,060,162 A | 5/2000 | Yin et al. | |
| 6,180,888 B1 | 1/2001 | Yin et al. | |
| 6,319,604 B1 | 11/2001 | Xu | |
| 2001/0018981 A1 | 9/2001 | Yin et al. | |

FOREIGN PATENT DOCUMENTS

| | | | |
|---|---|---|---|
| AT | E 211 513 T1 | 5/2002 | |
| CA | 1 192 797 | 9/1985 | |
| CA | 1219420 | 3/1987 | |
| CA | 1242044 | 9/1988 | |
| EP | 0 417 897 A1 | 3/1991 | |
| JP | 54-99137 | 8/1979 | |
| JP | 63-81173 | 4/1988 | |
| JP | 3-245417 | 11/1991 | |
| JP | 05320340 A | 12/1993 | |
| JP | 08165347 | 6/1996 | |
| JP | 09294652 | 11/1997 | |
| WO | WO 86/03329 | 6/1986 | |
| WO | WO03/033790 | * | 4/2003 |
| WO | WO03033790 | * | 4/2003 |

OTHER PUBLICATIONS

Safety data for cyanuric acid, Jun. 1, 2006.*
Kim Hwan Kyu et al., "Second-order NLO polyamideimides based on functionalized stilbene derivatives: direct polycondensation and characterization", *Polymer*, vol. 39, No. 8-9, p. 1719-1726, (1998).
Xu, "Improved Tough Wire", *Phelps Dodge Magnet Wire Company*, p. 469-473, (1999).
Xu et al, "Dynamic Mechanical Properties of Tough Magnet Wire", Phelps Dodge Magnet Wire Company, p. 163-168, (1998).
Poly-Thermaleze® TW (PTZ TW), Phelps Dodge Magnet Wire Company, Brochure, (1998).
Charrier, "Polymeric materials and processing plastics, elastomer, and composites," Oxford Univ. Press, p. 148, (1990).
Sen et al., "Synthesis and characterization of a rubber incorporated polyamideimide,", Makromol. Chem. 186: 1625-30, (1985).

* cited by examiner

*Primary Examiner* — James Seidleck
*Assistant Examiner* — Gregory Listvoyb
(74) *Attorney, Agent, or Firm* — Blank Rome LLP

(57) ABSTRACT

Polyamideimide coating compositions, including polyamideimide coating compositions suitable for magnet wire applications are described. Processes for preparing coating compositions, for coating articles such as magnet wire, and for curing coating compositions are also described.

6 Claims, No Drawings

POLYAMIDEIMIDE COMPOSITIONS HAVING MULTIFUNCTIONAL CORE STRUCTURES

CROSS REFERENCE TO RELATED APPLICATIONS

This application claims under 35 U.S.C. §119(e) the benefit of and priority to U.S. provisional patent application Ser. No. 60/580,457, filed Jun. 17, 2004, the disclosure of which is incorporated herein by reference in its entirety.

TECHNICAL FIELD

The present invention generally relates to polyamideimide coating compositions. In particular, this invention relates to polyamideimide compositions that include multifunctional core structures.

BACKGROUND

Magnet wires are used in the electromagnet windings found in electric motors, transformers, and other components having a conductive wire core. Such magnet wires are advantageously coated with various insulating or dielectric materials, including polymeric resins. Conventional polyamideimide enamels have been used as magnet wire coatings and in electronics packaging applications owning to their excellent thermal, mechanical, and electrical properties. Further, magnet wires may be precoated with a modified polyester and then over-coated with a polyamideimide. It has been shown that the polyamideimide overcoat provides improved mechanical properties over wires coated only with a polyester, including improved scrape resistance. Conventional polyamideimide enamels may be prepared using various copolycondensation reactions, such as the Carothers reaction of aromatic diisocyanates with a mixture of dicarboxylic acids and anhydrides of dicarboxylic acids to form an enamel solution as shown in Scheme 1:

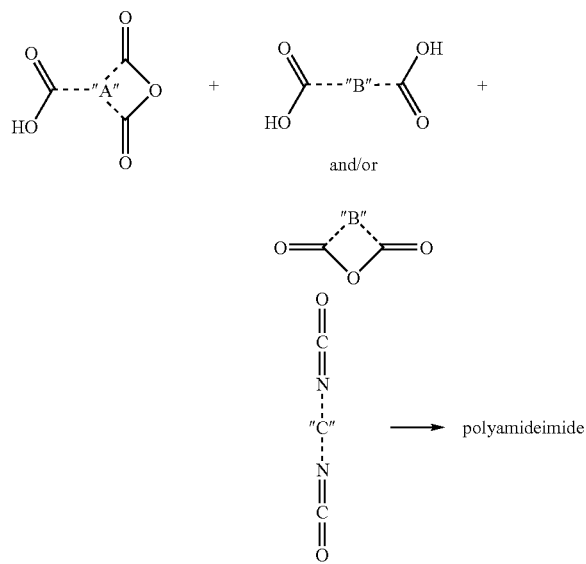

where A is the residue of an anhydride moiety and optionally may include additional anhydrides or other substituents having active hydrogens, B is the residue of a diacid moiety, and C is the residue of a diisocyanate moiety. It is appreciated that the diacid $HO_2C$—"B"—$CO_2H$ illustrated in Scheme 1 may also be the corresponding anhydride as shown. After filtration, such enamel solutions can be coated directly on magnet wires, or on magnet wires already having base coat, or other conventional pretreatment. These coated wires are cured in high temperature ovens, and a multiple pass process may be used for adequate curing and to provide an insulation protective layer having the surface smoothness necessary for coated wire applications. Conventional polyamideimide enamels prepared from such enamel solutions generally possess a linear chain backbone having both imide and amide linkages. These amide and imide groups may account for the observed thermal, mechanical, and electrical properties of these polymers.

The mechanical properties of the polyamideimide coatings can be evaluated using standard tests. For example, 18-gauge copper wire over-coated with conventional polyamideimide coatings generally shows a film hardness and NEMA unidirectional scrape resistance of about 1350-1450 grams, and repeated scrape resistance of about 50-100 strokes. Higher weight values and higher numbers of strokes, respectively, correspond to better scrape resistance. Although polyamideimide overcoated wires readily meet NEMA standard tests, recent advancements and modifications in motor manufacturing processes, such as fast coil winding, tough coil insertion, and environmental friendly varnishing processes, have generated the need for wire coatings that meet more stringent mechanical property requirements, such as increased film hardness and increased scrape resistance. It is further desirable that wire coatings maintain minimal electrical and thermal properties for each applied use, and all at comparable or lower overall costs with fewer negative consequences for the natural environment.

To meet these new demands, coatings that have properties such as improved unidirectional scrape resistance and/or improved repeated scrape resistance are desired. One way to provide such improved mechanical and thermal properties is by modifying the overcoat, such as a modified polyamideimide over-coat. Such modification may include changes in the chemical structure of the polymer molecules, or changes to the morphological structure of the aggregate of polymer molecules forming the overcoat.

Current methods for improving such mechanical properties generally involve increasing the molecular weight of the polyamideimide, increasing the aromatic character of or the number of aromatic moieties on the chain backbone, or increasing the oven curing time of the enamel. However, even slight increases in the molecular weight of these linear polymers may result in a concomitant and often drastic increase in the viscosity of the coating composition, because the viscosity of the coating solution follows the conventional viscosity laws and is therefore a function of the molecular weight of the viscoelastic polymer. Thus, in order to keep the viscosity within acceptable ranges, the solids content of the enamel solution is typically lowered to compensate. This lowering of solids content may result in increased processing and manufacturing costs and increased waste disposal costs.

Further, the strategy of increasing the aromatic character of or the number of aromatic moieties on the chain backbone also may lower the solubility of the polyamideimide, often resulting in the need to reduce the solids content of the enamel with the accompanying economic disadvantages described above. Finally, increasing the enamel curing time tends to increase overall production costs, and may result in a decrease in film flexibility, or result in dark-cured films.

Other efforts in improving polyamideimide coating compositions are described in French Patent No. 00408473 (disclosing that linear, aromatic polyamideimide can be functionalized through terminal groups containing latent maleimide functions for crosslinking); Kim Hwan Kyu et al., in Polymer, Vol. 39, No. 8-9, p 1719-26, 1998 (disclosing that branching stilbene derivatives can be attached onto a polyamideimide chain for second-order non-linear optics application); Japanese Patent No. 08165347 (disclosing that a polyamideimide chain containing a linear or branched $C_2$-$C_{20}$ alkylene chain for adhesive and coating applications); U.S. Pat. No. 6,319,604 (disclosing an abrasion resistant coated wire prepared using polyamideimide/nitride ceramic coatings).

SUMMARY OF THE INVENTION

Polyamideimide coating compositions that include multifunctional core structures, also referred to herein as star-core structures, are described herein. In one illustrative embodiment, coating compositions that include multifunctional core structures in the polyamideimide chain backbones are described. In variations of this embodiment, polyamideimides having multifunctional core structures in the branching arms are described. In further variations, polyamideimides having multifunctional core structures in both the chain backbones and in the branching arms are described.

In another embodiment, multifunctional core or star-structured polyamideimides having blocked reactive end groups are described. In one aspect, such blocked reactive end groups present on the star-structured polyamideimides described herein can be unblocked contemporaneously or simultaneously to maximize the crosslinking of the resulting coatings. In another aspect, such blocked reactive end groups present on the star-structured polyamideimides described herein can be unblocked in a controlled fashion to gradually or incrementally increase or otherwise adjust the level of crosslinking that occurs during for example the oven curing of the enamel coatings described herein.

In another illustrative embodiment, multifunctional core or star-structured polyamideimides that may be included in enamel coatings for use in making magnet wire are described. In one illustrative aspect, such coatings resulting from the multifunctional core or star-structured polyamideimides described herein exhibit higher toughness, higher modulus, higher strength, improved stiffness, improved film hardness, and/or improved scrape resistance over conventional polyamideimide coating compositions. In another illustrative aspect, the coatings described herein resulting from the multifunctional core or star-structured polyamideimides exhibit improved water and/or moisture resistance over conventional polyamideimide coating compositions. In another illustrative aspect, the coatings resulting from the multifunctional core or star-structured polyamideimides described herein exhibit improved mechanical and/or electrical properties making them particularly suitable for coating magnet wires. Illustrative enamel coatings prepared from the polyamideimide coating compositions described herein are suitable for use in preparing both conventional magnet wire coatings and those magnet wire coatings required to exhibit improved mechanical properties.

In another embodiment, the polyamideimide coating compositions described herein include the reaction products of:
(a) one or more acid anhydrides of triacids, and the like, and combinations thereof;
(b) one or more diisocyanates; and
(c) one or more multifunctional compounds.

In another embodiment, the polyamideimide coating compositions described herein also include (d) one or more fillers. In another embodiment, the polyamideimide coating compositions described herein also include (e) one or more nanofillers. In another embodiment, the polyamideimide coating compositions described herein also include (f) one or more fluoropolymer fillers. It is understood that the polyamideimide coating compositions described herein may also include various combinations of one or more fillers, one or more nanofillers, and/or one or more fluoropolymer fillers. In another embodiment, the polyamideimide coating compositions described herein also include (g) one or more diacids, one or more dianhydrides of tetraacids, and the like, and combinations thereof.

In another embodiment, the aggregate amount of (b) one or more diisocyanates is substantially stoichiometrically equivalent to the aggregate sum of the amounts of (a) one or more acid anhydrides of triacids, and the like, and combinations thereof, and (c) one or more multifunctional compounds that are included the reaction mixture forming the coating composition. In another embodiment, the aggregate amount of (b) one or more diisocyanates is in excess, such as in about 1% excess, of the aggregate sum of the amounts of (a) one or more acid anhydrides of triacids, and the like, and combinations thereof, and (c) one or more multifunctional compounds that are included the reaction mixture forming the coating composition. It is understood that if the polyamideimide coating compositions also include (g) one or more diacids, one or more dianhydrides of tetraacids, and the like, and combinations thereof, the stoichiometry of (b) one or more diisocyanates is adjusted to correspond to be either substantially stoichiometrically equivalent, or to be in excess, such as in about 1% excess, of the aggregate sum of the amounts of (a) one or more acid anhydrides of triacids, and the like, and combinations thereof, (c) one or more multifunctional compounds, and (g) one or more diacids, one or more dianhydrides of tetraacids, and the like, and combinations thereof that are included the reaction mixture forming the coating composition.

In another embodiment, a process for preparing polyamideimide enamel solutions is described. The process includes the step of reacting one or more compounds selected from (a) acid anhydrides of triacids, and combinations thereof, (b) one or more diisocyanates; (c) one or more multifunctional compounds, and optionally (g) one or more diacids, one or more dianhydrides of tetraacids, and combinations thereof. Illustratively, the reacting step is performed in a solvent, such as in a polar aprotic solvent, and at an elevated temperature, such as a temperature in the range from about 70° C. to about 160° C. Illustratively, the reacting step is performed for a period of time greater than about 2 hours, or for a period of time in the range from about 2 to about 6 hours.

In other embodiments that optionally include (d) one or more fillers, (e) one or more nanofillers, and/or (f) one or more fluoropolymer fillers, and combinations thereof, the process further comprises the step of adding the (d), (e), and/or (f) components either during or after the reacting step. Any one of, or any combination of the (d), (e), and/or (f) components may be added contemporaneously with or stepwise with any of the other (d), (e), and/or (f) components. In one aspect, the (d), (e), and/or (f) components are added during the reacting step at an elevated temperature, such as a temperature in the range from about 30° C. to about 150° C.

In one illustrative aspect of the coating compositions described herein, the reaction products form a stable formulation, and the reaction products mixture forming the coating composition has a high solids content, such as a solids content in the range from about 27 to about 32 weight percent. In another illustrative aspect of the coating compositions described herein, the coating compositions have a low viscosity, such as a viscosity of the reaction products mixture in the range from about 1200 cps to about 2000 cps at 38° C., as measured by a Brookfield viscometer.

In another embodiment, magnet wires coated with the star-structured polyamideimide coatings described herein are described. In one aspect, magnet wires are coated directly with the coating compositions described herein. In another aspect, magnet wires are precoated with a base coat made from any of a variety of heat resistant, electrical insulation materials. The magnet wire coatings described herein may been prepared using a wide range of curing speeds.

DETAILED DESCRIPTION

Polyamideimide coating compositions that include multifunctional core structures, also referred to as star-structured polyamideimide coating compositions, are described herein. In one embodiment, coating compositions that include multifunctional core structures in the polyamideimide chain backbones or star-structured polyamideimide chain backbones are described. In variations embodiment, polyamideimides having multifunctional core structures or star-structured components in the branching arms are described. In further variations, polyamideimides having multifunctional core structures or star-structured components in both the chain backbones and in the branching arms are described.

In another embodiment, the polyamideimide coating compositions described herein include the reaction products of:

(a) one or more acid anhydrides of triacids, and the like, and combinations thereof;

(b) one or more diisocyanates; and (c) one or more multifunctional compounds; and optionally (g) one or more diacids, one or more dianhydrides of tetraacids, and the like, and combinations thereof.

Illustrative (a) acid anhydrides of triacids, and dianhydrides of tetraacids include compounds having additional acid and anhydride groups such as trimellitic acid, trimellitic anhydride (TMA), pyromellitic acid, pyromellitic anhydride, mellophanic acid, mellophanic anhydride, benzene-1,2,3-tricarboxylic acid anhydride, 1,2,5-naphthalenetricarboxylic anhydride (NTCA), 3,3',4-diphenyltricarboxylic anhydride (DPTCA), 3,3',4-benzophenonetricarboxylic anhydride (BPTCA), 2,6,7-naphthalene tricarboxylic anhydride, 3,3',4-diphenyl tricarboxylic anhydride, 3,3',4-benzophenone tricarboxylic anhydride, 1,3,4-diphenyl tricarboxylic anhydride, diphenyl sulfone 3,3',4-tricarboxylic anhydride, 3,4,10-perylene tricarboxylic anhydride, 3,4-dicarboxyphenyl 3-carboxyphenyl ether anhydride, ethanetricarboxylic anhydride, 1,2,5-naphthalene tricarboxylic anhydride, and the like, and combinations thereof.

Illustrative (g) diacids and dianhydrides of tetraacids useful in the polyamideimide coating compositions and processes described herein include, but are not limited to, aliphatic cyclic and acyclic diacids and anhydrides, aromatic and heteroaromatic diacids and anhydrides, and combinations thereof. Illustrative diacid and anhydride compounds include optionally substituted alkyl, cycloalkyl, phenyl, diphenyl, phenylalkylphenyl, phenoxyphenyl, benzophenone, phenylsulfonylphenyl, phenoxydiphenyloxyphenyl, phenylalkylphenylalkylphenyl, phenoxyphenylalkylphenoxyphenyl diacids and anhydrides, and the like, and combinations thereof. Examples include, but are not limited to, paraphthalic acid, metaphthalic acid, orthophthalic acid, isophthalic acid, terephthalic acid, phthalic anhydride, 4,4'-oxy-bisbenzoic acid, dicarboxyl-terminated polybutadiene, including dicarboxyl-terminated polybutadiene having a molecular weight of about 4200, dicarboxyl-terminated poly (acrylonitrile-co-butadiene), such as dicarboxyl-terminated poly(acrylonitrile-co-butadiene) having a molecular weight in the range from about 3500 to about 3800, $C_3$-$C_{12}$ dicarboxylic acids, including malonic acid, succinic acid, glutaric acid, adipic acid, pimelic acid, suberic acid, azelaic acid, sebacic acid, 1-11-undecanedioic acid, 1,12-dodecanedioic acid, brassylic acid, 1,3-cyclopentanedicarboxylic acid, 1,4-cyclohexanedicarboxylic acid, and the corresponding anhydrides, CORFREE® M1, and the like, and combinations thereof.

Other illustrative (g) dianhydrides include the dianhydrides of benzene-1,2,3,4-tetracarboxylic acid, diphenyl-3,3',4,4'-tetracarboxylic acid, diphenyl-2,2',3,3'-tetracarboxylic acid, naphthalene-2,3,6,7-tetracarboxylic acid, naphthalene-1,2,4,5-tetracarboxylic acid, naphthalene-1,4,5,8-tetracarboxylic acid, decahydronaphthalene-1,4,5,8-tetracarboxylic acid, 4,8-dimethyl-1,2,3,5,6,7-hexahydronaphthalene-1,2,5,6-tetracarboxylic acid, 2,6-dichloronaphthalene-1,4,5,8-tetracarboxylic acid, 2,7-dichloronaphthalena-1,4,5,8-tetracarboxylic acid, 2,3,6,7-tetrachloronaphthalene-1,4,5,8-tetracarboxylic acid, phenanthrene-1,3,9,10-tetracarboxylic acid, perylene-3,4,9,10-tetracarboxylic acid, bis(2,3-dicarboxyphenyl)methane, bis(3,4-dicarboxyphenyl)methane, 1,1-bis(2,3-dicarboxyphenyl)ethane, 1,1-bis(3,4-dicarboxyphenyl)ethane, 2,2-bis(2,3-dicarboxyphenyl)propane, 2,3-bis(3,4-dicarboxyphenyl)propane, bis(3,4-dicarboxyphenyl) sulfone, bis(3,4-dicarboxyphenyl)ether, ethanetetracarboxylic acid, butane-1,2,3,4-tetracarboxylic acid, cyclopentane-1,2,3,4-tetracarboxylic acid, pyrrolidine-2,3,4,5-tetracarboxylic acid, pyrazine-2,3,5,6-tetracarboxylic acid, thiophen-2,3,4,5-tetracarboxylic acid, benzophenone-3,3',4,4'-tetracarboxylic acid, and like dianhydrides, and combinations thereof.

It is understood that any of the foregoing compounds that include diacids capable of forming an anhydride, may be used in the corresponding anhydride form in the compositions and processes described herein. For example, orthophthalic acid may be used as phthalic anhydride, succinic acid may be used as succinic anhydride, and the like. In addition, each of the foregoing diacids, acid anhydrides, and dianhydrides may be substituted with one or more appropriate groups, such as halogen, alkyl, alkoxy, nitro, and the like.

Illustrative (b) diisocyanate compounds useful in the polyamideimide coating compositions and processes described herein include, but are not limited to, aliphatic cyclic and acyclic diisocyanates, aromatic and heteroaromatic diisocyanates, and the like, and combinations thereof. Illustrative diisocyanates include 4,4'-diphenylmethane diisocyanate (MDI), aliphatic diisocyanate DDI_1410, 3,3'-dimethoxy-4,4'-biphenylene diisocyanate (DBDI), 2,4-toluene diisocyanate, 2,6-toluene diisocyanate, 4,4'-methylenebis(phenylisocyanate), dianisidine diisocyanate, tolidine diisocyanate, 4,4'-diphenylether diisocyanate, 4,4'-methylenebis(cyclohexylisocyanate), meta-xylene diisocyanate, 1,5-naphthalene diisocyanate, tetramethylenediisocyanate, hexamethylenediisocyanate, 1,4-phenylenediisocyanate, 1,3-phenylenediisocyanate, 1,4-cyclohexylenediisocyanate, 2,4-tolylenediisocyanate, 2,5-tolylenediisocyanate, 2,6-tolylenediisocyanate, 3,5-tolylenediisocyanate, 4-chloro-1,3-phenylenediisocyanate, 1-methoxy-2,4-phenylenediisocyanate, 1-methyl-3,5-diethyl-2,6-phenylenediisocyanate, 1,3,5-triethyl-2,4-phenylenediisocyanate, 1-methyl-3,5-diethyl-2,4-phenylenediisocyanate, 1-methyl-3,5-diethyl-6-chloro- 2,4-phenylenediisocyanate, 6-methyl-2,4-diethyl-5-nitro-1, 3-phenylenediisocyanate, para-xylylenediisocyanate, meta-xylylenediisocyanate, 4,6-dimethyl-1,3-xylylenediisocyanate, 1,3-dimethyl-4,6-bis-(β-isocyanatoethyl)benzene, 3-(α-isocyanatoethyl) phenylisocyanate, 1-methyl-2,4-cyclohexylenediisocyanate, 4,4'-biphenylenediisocyanate, 3,3'-dimethyl-4,4'-biphenylenediisocyanate, 3,3'-dimethoxy-4,4'-biphenylenediisocyanate, 3,3'-diethoxy-4,4'-biphenylenediisocyanate, 1,1-bis (4-isocyanatophenyl)cyclohexane, 4,4'-diisocyanatodiphenylether, 4,4'-diisocyanatodicyclohexylmethane, 4,4'-diisocyanatodiphenylmethane, 4,4'-diisocyanato-3,3'-dimethyldiphenylmethane, 4,4'-diisocyanato-3,3'-dichlorodiphenylmethane, 4,4'-diisocyanatodiphenyldimethylmethane, 1,5-naphthylenediisocyanate, 1,4-naphthylenediisocyanate, 4,4',4"-triisocyanatotriphenylmethane, 2,4,4'-triisocyanatodiphenylether, 2,4,6-triisocyanato-1-methyl-3, 5-diethylbenzene, ortho-tolidine-4,4'-diisocyanate, meta-tolidone-4,4'-diisocyanate, benzophenone-4,4'-diisocyanate, biuret triisocyanates, polymethylenepolyphenylene isocyanates, and the like, and combinations thereof. It is appreciated that any of the foregoing diisocyanates may be substituted with appropriate groups, such as halogen, alkyl, alkoxy, nitro, and the like.

Illustrative (c) multifunctional compounds include compounds that have three or more reactive functional groups, including one or more hydroxyl, amino, carboxyl, carbamoyl, and like groups, derivatives of such groups, and combinations thereof. Multifunctional compounds may also be termed star-structure initiators, star-cores, zig-zag initiators, or dendritic structure initiations. In general, (c) multifunctional compounds are capable if forming branched structures in the polyamideimide coating compositions described herein. Such branched structures may arise from polymerization being initiated from at least three of the three or more reactive functional groups on the multifunctional compounds. Further, the branched structures may be located in the main chain or backbone of the reactive products that form the coating composition, or alternatively, may the branched structures may be located in the arms of the reactive products that form the coating composition. It is understood that the three or more reactive functional groups on the multifunctional compounds may be capable of reacting with acids, anhydrides, or isocyanates to form the branched core structures. In one illustrative embodiment, at least one of the reactive functional groups on the multifunctional compounds is capable of reacting with isocyanates.

In one illustrative embodiment, (c) multifunctional compounds include compounds that have three or more reactive functional groups, including one or more hydroxyl, amino, carboxyl, carbamoyl, and like groups, derivatives of such groups, and combinations thereof, where there is at least one free carboxylic acid functional group on the multifunctional compound.

In another illustrative embodiment, (c) multifunctional compounds include compounds that have three or more reactive functional groups, including one or more hydroxyl, amino, carboxyl, carbamoyl, and like groups, derivatives of such groups, and combinations thereof, where there is at least one aromatic nitrogen having a pKa of less than about 4, or having a pKa in the range from about 2 to about 4, or in the range from about 2 to about 3, such as isocyanuric acid, melamine derivatives that include alkoxy and/or acyloxy groups, and the like. In one aspect, such melamine derivatives that include alkoxy and/or acyloxy groups are partial derivatives, such as having alkoxy and/or acyloxy groups in about 40-75% of the melamine positions, or in about 45-55% of the melamine positions. Illustrative of such compounds are mixtures of 1-alkoxy and 1,3-dialkoxy melamines, 1-acyloxy and 1,3-diacyloxy melamines, and the like. It is appreciated that the degree of derivatization or the nature of the derivatizing groups may be selected and used to moderate the rate of reaction in forming the coating compositions descried herein. For example, higher degrees of derivatization tend to slow the reaction rate. In addition, higher molecular weight derivatizing groups, such as octyl, nonyl, dodecyl, and the like, compared to methyl, ethyl, propyl, and the like, tend to slow the reaction rate. It is understood that melamine derivatives that have a high pKa, such as a pKa greater than about 8, including tris(hydroxyethoxy)isocyanuric acid (THEIC) may not be useful as multifunctional compounds because such compounds tend to form urethane or carbamate linkages with diisocyanates rather than amide or imide linkages with acids and anhydrides.

Illustrative (c) multifunctional compounds useful in the compositions and processes described herein include, but are not limited to, isocyanuric acid (ICA), butane tetracarboxylic acid (BTCA), citric acid (CA), polyacrylic acid (PAA), polymethacrylic acid (PMA), and poly(methyl methacrylate-co-methacrylic acid) (PMMA-MA), benzoic tetracarboxylic acid (BzTCA), phenolic resin, dicarboxy-terminated poly (acrylonitrile-co-butadiene-co-acrylic acid), poly(acrylamide-co-acrylic acid 10%), polyamide-amic acid (Solvay AI-10), benzene-1,2,3-tricarboxylic acid, 1,2,5-naphthalenetricarboxylic, 3,3',4-diphenyltricarboxylic, 3,3',4-benzophenonetricarboxylic, 2,6,7-naphthalene tricarboxylic, 3,3',4-diphenyl tricarboxylic, 3,3',4-benzophenone tricarboxylic, 1,3,4-diphenyl tricarboxylic, diphenyl sulfone 3,3', 4-tricarboxylic, 3,4,10-perylene tricarboxylic, 3,4-dicarboxyphenyl 3-carboxyphenyl ether, ethanetricarboxylic, 1,2,5-naphthalene tricarboxylic, benzene-1,2,3,4-tetracarboxylic acid, diphenyl-3,3',4,4'-tetracarboxylic acid, diphenyl-2,2',3, 3'-tetracarboxylic acid, naphthalene-2,3,6,7-tetracarboxylic acid, naphthalene-1,2,4,5-tetracarboxylic acid, naphthalene-1,4,5,8-tetracarboxylic acid, decahydronaphthalene-1,4,5,8-tetracarboxylic acid, 4,8-dimethyl-1,2,3,5,6,7-hexahydronaphthalene-1,2,5,6-tetracarboxylic acid, 2,6-dichloronaphthalene-1,4,5,8-tetracarboxylic acid, 2,7-dichloronaphthalene-1,4,5,8-tetracarboxylic acid, 2,3,6,7-tetrachloronaphthalene-1,4,5,8-tetracarboxylic acid, phenanthrene-1,3,9,10-tetracarboxylic acid, perylene-3,4,9, 10-tetracarboxylic acid, bis(2,3-dicarboxyphenyl)methane, bis(3,4-dicarboxyphenyl)methane, 1,1-bis(2,3-dicarboxyphenyl)ethane, 1,1-bis(3,4-dicarboxyphenyl)ethane, 2,2-bis(2,3-dicarboxyphenyl)propane, 2,3-bis(3,4-dicarboxyphenyl)propane, bis(3,4-dicarboxyphenyl)sulfone, bis(3,4-dicarboxyphenyl)ether, ethanetetracarboxylic acid, butane-1, 2,3,4-tetracarboxylic acid, cyclopentane-1,2,3,4-tetracarboxylic acid, pyrrolidine-2,3,4,5-tetracarboxylic acid, pyrazine-2,3,5,6-tetracarboxylic acid, thiophen-2,3,4, 5-tetracarboxylic acid, benzophenone-3,3',4,4'-tetracarboxylic acid, and the like, and combinations thereof.

In another illustrative embodiment, (c) multifunctional compounds useful in the compositions and processes described herein include, but are not limited to, isocyanuric acid (ICA), butane tetracarboxylic acid (BTCA), citric acid (CA), polyacrylic acid (PAA), polymethacrylic acid (PMA), and poly(methacrylate-co-acrylic acid) (PMA-AA), poly(methyl methacrylate-co-acrylic acid) (PMMA-AA), poly(methyl methacrylate-co-methacrylic acid) (PMMA-MA), benzoic tetracarboxylic acid (BzTCA), phenolic resin, dicarboxy-terminated poly(acrylonitrile-co-butadiene-coacrylic acid), poly(acrylamide-co-acrylic acid 10%), polyamide-amic acid (Solvay AI-10), and the like, and combinations thereof.

In another illustrative embodiment, (c) multifunctional compounds useful in the compositions and processes described herein include copolymers of acrylic acid and methacrylic acid, copolymers of acrylic acid and methyl methacrylate, copolymers of methacrylic acid, and methyl methacrylate, and copolymers of acrylic acid, methacrylic acid, and methyl methacrylate. In one illustrative aspect, the copolymers have a molecular weight average in the range from about 10 to about 50 kDa, in the range from about 10 to about 25 kDa, and/or illustratively have a molecular weight of about 15 kDa. In another aspect, the copolymers have an average of about 2040, or about 20-25 free carboxylic acid groups. In another illustrative aspect, the free acid portion of the copolymer, such as the acrylic acid and/or the methacrylic acid comprises about 10-20%, about 12-18%, or about 15% of the copolymer on either a molecular weight basis, or on a molar basis.

It is appreciated that when polyamideimide coating compositions are prepared from mixtures as described herein, the arrangement of the components, such as the diacid, anhydride, diisocyanate, and multifunctional compound residues present in the polymeric structure, may be arranged in regular, irregular, and/or random patterns. It is understood that the regularity, irregularity, or randomness may be adjusted or modified by routine optimization of the conditions described herein for preparing the coating compositions. It is also appreciated that the diacid, anhydride, diisocyanate, and multifunctional compound components may form block polymers that are subsequently arranged into larger polymers in regular, irregular, and/or random patterns.

In another embodiment, the polyamideimide coating compositions described herein also include (d) one or more fillers. In another embodiment, the polyamideimide coating compositions described herein also include (e) one or more nanofillers. In another embodiment, the polyamideimide coating compositions described herein also include (f) one or more fluoropolymer fillers. It is understood that the polyamideimide coating compositions described herein may also include various combinations of (d) one or more fillers, (e) one or more nanofillers, and/or (f) one or more fluoropolymer fillers.

Illustrative (d) fillers useful in the polyamideimides described herein include, but are not limited to, ceramic fillers, including nitrides, such as silicon nitride ($Si_3N_4$), aluminum nitride (AlN), titanium nitride (TiN), and the like; polymeric fillers, including polyethylene powder, polypropylene powder, polybutylene powder, and the like, and combinations thereof. Such fillers may have particle sizes in the range from about 1 to about 10 microns, and are illustratively in the range from about 3 to about 5 microns for ceramic fillers, and in the range from about 5 to about 15 microns, and are illustratively in the range from about 5 to about 10 microns for polymeric fillers. In addition, such fillers may be present in the range from about 1 to about 15% by weight, and are illustratively in the range from about 3 to about 6% by weight for ceramic fillers, and about 1% by weight for polymeric fillers. It is appreciated that in certain variations of the coating compositions described herein, the addition of fillers in excess of 15% is contemplated. It is further understood that in other variations of the coating compositions described herein, the addition of fillers in excess of 15% may adversely affect the flexibility of the coated wires formed therefrom.

Illustrative (e) nanofillers useful in the polyamideimides described herein include, but are not limited to, Claytone, and other nanoclay materials with high aspect ratios, illustratively 1000:1, and the like, and combinations thereof. Particle sizes include those in the range from about 0.1 micron to about 3 microns.

Illustrative (f) fluoropolymer fillers useful in the polyamideimides described herein include, but are not limited to, polytetrafluoroethylene (PTFE) powder, polychlorotrifluoroethylene, polyvinylidene fluoride, fluorinated ethylene propylene copolymer, and the like, and combinations thereof. Such fluoropolymer fillers may have particle sizes in the range from about 0.5 to about 10 microns, and are illustratively in the range from about 1 to about 3 microns. In addition, such fillers may be present in the range from about 1% by weight.

In one illustrative embodiment, the polyamideimide coating compositions described herein include the reaction products of trimellitic anhydride (TMA), 4,4'-diphenylmethane diisocyanate (MDI), and a multifunctional compound. In another illustrative embodiment, the polyamideimide coating compositions described herein also include (d) one or more fillers, (e) one or more nanofillers, and/or (f) one or more fluoropolymer fillers. In another illustrative embodiment, the polyamideimide coating compositions described herein also include (g) one or more diacids, one or more dianhydrides of tetraacids, and the like, and combinations thereof.

It is appreciated that in various embodiments of the polyamideimide coating compositions described herein, the star-structured polymer chains can stabilize the dispersion of various fillers (d), (e), and/or (f) that are included in the coating compositions. Further, and without being bound by theory, it is suggested that the zigzag, star-like, and/or maze-like nature of the polyamideimide chemical structures that are formed when multifunctional compounds are included in polyamideimide coating compositions, as described herein, may be beneficial to the enamel dispersion stability of various fillers. Still further, and without being bound by theory, it is suggested that the otherwise widely varying surface tension between some fillers, nanofillers, and/or fluoropolymer fillers and the polyamideimide coating composition may lead to defects, weak points, bubbles, craters, pockets, and other undesirable microstructures in the cured coating compositions. Such undesirable microstructures may tend to decrease the mechanical and or electrical properties of the cured coatings.

In one aspect, the mole ratio of component (b) to the sum of components (a) and (c), or (a), (c), and (g), in each of the various coating compositions described herein, is in the range from about 1.01 to about 1.0. In another aspect, the amount of component (c) relative to the sum of components (a) and (b), or (a), (b), and (g), in each of the various coating compositions described herein is in the range from about 0.5 to about 5 wt %, based on solids. In another aspect, the mole ratio of an aromatic diacid to an aliphatic acid in component (a), or (a) and (g), in various coating compositions described herein is in the range from about 1 to about 4. In another aspect, the weight ratio of the sum of components (a), (b), and (c), or (a), (b), (c), and (g), to the sum of filler components (d), (e), and/or (f), in various coating compositions described herein, is in the range from about 350 to about 100, and is illustratively in the range from about 340 to about 113. In another aspect, the amount of the sum of components (d), (e), and/or (f) relative to the sum of components (a), (b), and (c), or (a), (b), (c), and (g), in various coating compositions described herein is less than about 10 wt %, based on solids. In another aspect, the amount of the sum of components (d), (e), and/or (f) relative to the sum of components (a), (b), and (c), or (a), (b), (c), and (g), in various coating compositions described herein is in the range from about 0.3 to about 5 wt %, based on total weight.

In one aspect, the sum of the amounts of components (a) and (c), or (a), (c), and (g), are used in an amount substantially stoichiometrically equivalent to the amount of component (b). In one variation, the amount of component (b) is used in a slight stoichiometric excess to the sum of the amounts of components (a) and (c), or (a), (c), and (g). In general, component (c) is typically in the range from about 0.5% to about 5% by weight of the monomer solids.

In another embodiment, the polyamideimide coating compositions include between about 1.005 and about 1.0 moles of MDI, between about 0.8 and about 1.0 moles of TMA, between about 0.2 and about 0.02 moles of an aromatic diacid, between about 0 and about 0.10 moles of an aliphatic diacid, and between about 0 and about 0.20 moles of a multifunctional compound. The amount of diisocyanate is substantially stoichiometrically equivalent to the sum of the amounts of the diacids, TMA, and multifunctional compounds. In one aspect of this embodiment, the multifunctional compounds are selected from butane tetracarboxylic acid, citric acid, polyacrylic acid, PMMA-MA, phenolic resin, isocyanuric acid (ICA), benzoic tetracarboxylic acid, and benzenetricarboxylic acid, and the like.

In another embodiment, star-structured polyamideimides having blocked reactive end groups are described. It is understood that because of the nature and structure of the star-structured polyamideimides described herein, the relative number of blocked reactive end groups may be high as compared to conventional linear polyamideimides. In one aspect, these blocked reactive end groups present on the star-structured polyamideimides can be unblocked contemporaneously to maximize the level of crosslinking in the resulting coatings described herein. In another aspect, these blocked reactive end groups can be unblocked in a controlled and predetermined manner to increase or otherwise adjust the level of crosslinking that may occur during for example the heat-induced curing of the enamel coatings described herein.

Blocked reactive end groups include isocyanates that have been reacted with compounds that include active hydrogens, such as alcohols, and that can be unblocked in a controlled fashion, such as by heating to predetermined temperatures. Unblocking the blocked reactive end groups allows the subsequently exposed functional groups to participate for example in crosslinking reactions during heat-induced curing, and other processes. Blocked end groups can be prepared contemporaneously with the preparation of the coating composition by adding for example alcohols including alkyl alcohols, cycloalkyl alcohols, aryl alcohols, heteroaryl alcohols, and the like, and combinations thereof. Such alcohols react with terminal isocyanates present on the star-structured polymer to form carbamates. These carbamates can be decomposed under predetermined conditions to expose amino groups that can be involved in the formation of crosslinks with nearby polymer molecules by forming amides and imides with terminal acids, diacids, or anhydrides present on these proximal polymer molecules.

In another embodiment, a process for preparing polyamideimide coating solutions is described. The process includes the steps of: (i) reacting the compounds selected from (a) acid anhydrides of triacids, and combinations thereof; (b) one or more diisocyanates; and (c) one or more multifunctional compounds, and optionally (g) one or more diacids, dianhydrides of tetraacids, and combinations thereof; in a solvent; and (ii) heating the mixture to form the polyamideimide coating composition. The process is illustratively performed at a temperature in the range from about 70 to about 160° C. for a time in the range from about 2 to about 6 hours. In one aspect, the polymerization reaction is stopped by cooling the reaction mixture. In another aspect, the polymerization reaction is stopped by adding for example alcohols, NMP, NJ100, and the like, and combinations, thereof. It is appreciated that adding an alcohol to stop the polymerization reaction may also cap or block the remaining reactive end groups, such as by the reaction of the alcohol with isocyanate end groups to form carbamate blocking groups.

In one aspect, solvents suitable for carrying out the processes described herein include polar aprotic solvents, aromatic solvents, hydrocarbon solvents, and the like, and combinations thereof. Illustratively, solvents include, but are not limited to, N-methylpyrrolidinone (NMP), N,N-dimethylacetamide, N,N-diethylacetamide, N,N,-dimethylformamide, N,N-diethylformamide, dimethylsulfoxide, diethylsulfoxide, sulfolane, tetramethylenesulphone, 1,1,3,3-tetramethylurea, 1,3-dimethylurea, hexamethylphosphoramide (HMPA), NJ100, NJ150, NJ200, para xylene, meta xylene, ortho xylene, naphtha, heptane, hexane, LACOLENE, and the like, and combinations and mixtures thereof. Illustratively, a mixture of aromatic solvents and NMP, and/or a mixture a mixture of aromatic hydrocarbons and NMP are suitable solvent systems for the processes and coating compositions described herein.

In another embodiment, the polyamideimide coating composition comprises from about 25 to about 45 weight percent solids. In one aspect, the polyamideimide coating composition comprises from about 30 to about 40 weight percent of a multifunctional monomer/polymer-initiated polyamideimide polymer. In another aspect, the resulting reaction mixture is a stable formulation, and has a solids content in the range from about 27% to about 32% by weight. In another aspect, the viscosity of the resulting reaction mixture, as measured by Brookfield viscometer, is in the range from about 1200 cps to about 2000 cps at 38° C.

In another aspect, the processes described herein are carried out in two-stages, wherein the reaction mixture is held for a period of time at a first lower temperature and thereafter the reaction mixture is heated to a second higher elevated temperature to increase polymerization and promote the formation of branched or highly branched structures from the multifunctional compound, such as for example crosslinking of the star-like multifunctional compound in the composition.

In one aspect, the reaction is continued until analysis of the reaction mixture reveals that substantially all of the diisocyanate components have reacted. Such an analysis may be made using spectroscopy, including infrared spectroscopy, nuclear magnetic spectroscopy, mass spectroscopy, and the like. Subsequently, the resulting polyamideimide coating compositions are concentrated or diluted with solvents to provide solids levels in the range from about 30% to about 40% by weight.

In embodiments that include one or more fillers, one or more nanofillers, and/or one or more fluoropolymer fillers, and combinations thereof, process further comprises the step of blending these components with the mixture resulting from the reacting step described herein at a temperature in the range from about 30° C. to about 150° C. Illustratively, such filler components may be added in an amount to provide a coating composition containing less than 10% by weight, less than 5% by weight, or in the range from about 1% to about 4% by weight based on solids. In variations, such filler components are illustratively added in an amount necessary to provide a coating composition containing less than about 1% by weight based on solids, less than about 0.5% by weight, or in the range from about 0.01% to about 0.1% by weight.

In some embodiments of the compositions and processes described herein, a trace amount of a wax is added to improve the reaction and the coating characteristics. Waxes include versar wax, paraffins, including petroleum paraffins, fatty acids and triglycerides, including hydrogenated triglycerides, $C_{14-22}$ fatty acids, vinyl-terminated silicone oils, and the like, and combinations thereof. Without being bound by theory it is suggested that the trace wax added may improve the reaction and coating characteristics. In variations, a small amount of additives including versar wax, aliphatic diisocyanates, fluorocarbon-based surfactants, and combinations thereof may be added.

In another embodiment of the process for preparing multifunctional core or star-structured polyamideimide coating compositions is described, a safe manufacturing window through which the polyamideimides can be made is used. In one aspect, processes for preparing star-structured polyamideimide coating compositions that substantially avoid gelation of large enamel batches are also described. Gelation of enamel coating compositions is often an undesirable event in processes including polyamideimide coating compositions. Processes that substantially avoid gelation include a safe manufacturing window through which the polyamideimide coating compositions can be made. It is appreciated that in certain embodiments, and under similar conditions, acidic-containing multifunctional compounds offer more gelation control than other multifunctional compounds, having different combinations of functional groups present on multifunctional component. Without being bound by theory, it is believed that without a well-balanced stoichiometry of the entire reaction system of star-structured polyamideimide, subsequent polymerization reactions to form the polyamideimide coating compositions may result in gelation or irreversibly high viscosity of the resultant enamel solution.

Further, it is understood that the gel point is generally governed by Carothers Equation, or alternatively by a statistical approach for dealing with the gel point, as described in George Odian, Principles of Polymerization, $2^{nd}$ Edition, 1981, the disclosure of which is incorporated by reference. In large scale manufacturing of the processes described herein, it is appreciated that the molecular weight or chain length of each arm of star-structured polyamideimide polymer should be balanced with the maintenance of a wide safe zone prior to the gel point. Sufficient chain lengths of each arm are those that reflect an overall molecular weight high enough to provide the desirable magnet wire properties described after the heat-induced crosslinking reaction.

The structure of the polyamideimide components of the coating compositions described herein are generally characterized by the structures forming from the multifunctional compounds, such as star-like or dendritic cores, which derive from the use of one or more of the multifunctional core polymerization compounds described herein. The resulting polymers can have high molecular weights; however, these polymers are unlike the long linear polymer chains found in conventional polyamideimides that can lead to high viscosity coating compositions even at low polymer solids levels.

In another embodiment, the coating compositions described herein may be cured at elevated or high temperature in a curing oven. Polymerization crosslinking of the resulting star-core polymer structures results in a complex crosslinked polymer maze network architecture that may be responsible for the observed desirable coating performance characteristics. In certain aspects, the enamel coatings prepared from the polyamideimide coating compositions described herein may exhibit improved physical and mechanical properties, including but not limited to enhanced film hardness, scrape resistance, water and moisture resistance, hardness, toughness, impact strength, flexibility, crack resistance, and the like.

In one embodiment, the polyamideimide coating compositions described herein include star-structured polyamideimide chain backbones that form scrape resistant coatings. In one aspect, the polyamideimide coating compositions described herein have high solids contents, but with viscosities comparable to conventional coatings. It is appreciated that conventional polyamideimide enamel solutions tend to form solutions containing commodious random coil structures because of the long linear polyamideimide chains. In contrast, it is appreciated that the polyamideimides described herein have compact molecular architectures. Such structural differences allow the solids content of the coating compositions described herein to be increased above levels allowed by conventional coatings. In one aspect, solids content can be increased without dramatically increasing the viscosity of the polyamideimide enamel solutions. It is appreciated that star-structured polyamideimide chains contained in the coatings described herein may be entangled to form a zigzag network or a maze-like structure. Without being bound by theory, it is believed that this entangled network may contribute to water/moisture and gas penetration resistance observed by magnet wires coated therewith, when such filmed or coated wires are exposed to moisture or to humid and/or oxygen-rich environments. In another aspect, enamels prepared from the polyamideimide coating compositions described herein exhibit high film hardness.

For example, it is understood that oxidative degradation of polymeric film is a major cause of film cracking, and can result in premature performance failure of filmed or coated magnet wires. Oxidative cracking may be aggravated in locations on the coated magnet wire where weak spots or microdamage has been created during the winding or handling of the coated magnet wire. Coatings that exhibit greater scrape resistance, toughness, and the like, may resist oxygen and/or moisture and prolong performance of the coated wire.

In another embodiment, star-structured polyamideimides that may be included in an enamel coating compositions for use in making coated magnet wire are described. In other aspects, the coatings resulting from the star-structured polyamideimides described herein exhibit mechanical and electrical properties suitable for coating magnet wires. Enamel coatings prepared from polyamideimides described herein are suitable for use in preparing conventional magnet wire coatings and those magnet wire coatings required to exhibit improved mechanical properties, such as improved toughness, stiffness, modulus, hardness, impact strength, moisture and humidity resistance, scrape resistance, delamination resistance, high modulus, and the like. The enamel coating compositions described herein may be prepared at a wide range of cure speeds, including but not limited to 200 ft/minute.

In another embodiment, magnet wires coated with the star-structured polyamideimide coatings described herein are described. In one aspect, any suitable conductive core may be used to fabricate the coated magnet wires described herein, including but not limited to copper, aluminum, gold, copper clad aluminum, silver plated copper, nickel plated copper, aluminum alloy 1350, and the like, and alloys and combinations thereof. In another aspect, the magnet wires are pre-coated with a base coat made from any of a variety of heat resistant, electrical insulation materials, such as polyesters, polyesters used as basecoat and bondable coat, polyesteramides, polyesteramideimides, polyesterurethanes, polyimides, polyethers, polyetherimides, polyesterimides, polyamides, polyetheramides, conventional polyamideimides, polyetheramideimides, epoxy resins, polyarylsufones, polyetheretherketones, terephthalic acid alkyds, polyurethanes, epoxy resins, silicone resins, polymers incorporating polyhydantoin, phenolic resins, vinyl copolymers, polyolefins, polycarbonates, polyisocyanates, trishydroxyethyl isocyanurate (THEIC) based polyester coatings and the like, and combinations thereof.

The coatings described herein may be applied to the magnet wire using any conventional techniques, including but not limited to forming a prefabricated film that is wound around the conductor, applying using extrusion coating techniques, forming from one or more fluid thermoplastic or thermosetting polymeric resins and applying to the magnet wire, followed by drying and/or curing the coating using one or more suitable curing and/or drying techniques such as chemical, radiation, or thermal treatments.

In another embodiment, the coating composition is applied to magnet wires precoated with a polyester or other suitable base coating material. The resulting over-coated wire is thereafter heated in the range from about 175 to about 250° C. for a period of time sufficient to effect crosslinking at the applied polyamideimide coating composition.

In another aspect, the polyamideimide coating compositions described herein are applied to magnet wires precoated illustratively with, but not necessarily limited to, a trishydroxyethyl isocyanurate (THEIC) based polyester coating, and the like. The coated copper or aluminum wire is thereafter heated in an oven for a period of time sufficient to effect crosslinking of the applied polyamideimide coating composition.

The examples of polyamideimide coating compositions, wires coated with polyamideimide coating compositions, and cured polyamideimide coating compositions are described herein.

Example 1

Comparative Coating 1

A control polyamideimide coating composition was prepared according to the following procedure. A mixture of 1 mole of diphenylmethane 4,4-diisocyanate (MDI), 0.70 mole of trimellitic anhydride (TMA), and 0.30 of Adipic acid (AA), or alternatively, 0.10 mole of AA and 0.20 mole of isophthalic acid (IPA), and a mixed solvent of N-methyl pyrrolidinone (NMP) and an aromatic hydrocarbon solvent was added to a dry clean three-necked 2000 ml kettle equipped with a stirrer and nitrogen purge. Trace amounts of versar wax and aliphatic diisocyanate were also added to make stoichiometric balance of the system. The reaction was carried out at 70-90° C. for 3-4 h, and then the temperature was raised to 120-150° C. for 1-2 h. A solution sample was taken for FTIR measurement to determine reaction progress by the disappearance of diisocyanate groups. The reaction was then stopped with a mixture of alcohol, NMP, and aromatic hydrocarbon solvents. Illustrative alcohols include butanol, isopropyl alcohol, ethylhexanol, and the like. The resultant solids content of the coating composition was about 28%, and the viscosity was about 1800-2000 cps.

An 18-gauge copper wire sample was made with precoated THEIC-based polyester and then overcoated with this branched polyamideimide. In particular, the resultant enamel for each control was applied to 18 AWG copper wires, each precoated with eight passes of polyester basecoat at the speed of 28-60 meters/minute in an oven having a temperature profile of about 450° C. to about 600° C. Similar results were achieved with cure speeds of 28-60 meter/minute in an 500° C. MAG oven; and at 50-60 meters/minute in a 600° C. MAG oven. The wall-to-wall build of the coated wire was illustratively controlled to be within about 3.5 mils, or within the range of about 3.0 to about 3.3 mils. The build ratio of topcoat to basecoat was controlled to be within the range from about 15%/85% to about 25%/75%, and was generally about 80% basecoat to about 20% topcoat. Illustratively, the topcoat is prepared in about 3-4 passes. It is appreciated that some topcoats prepared from only 2 passes may suffer blistering or produce microbubbles. Illustratively, enamel coatings built from greater than two passes are relatively insensitive to the curing conditions, including curing speed and oven temperature.

Wires or other objects coated with the coating compositions described herein were typically baked in an oven at about 200° C. for an hour in order to examine the resulting film flexibility and toughness. Selected properties of the resultant magnet wire are shown in Table 1.

Example 2

Comparative Coating 2

A control polyamideimide coating composition was prepared by mixing about 1% (by weight) fluoropolymer paste with the coating composition of Example 1. The resultant solids content was about 28-30%, and the viscosity was about 1800-2000 cps. Selected properties of the resultant magnet wire are shown in Table 1.

Example 3

A mixture of 270.5 g of MDI, 185 g of TMA, 5.5 g of AA, 11.5 g of IPA, 0.8 grams of butane tetracarboxylic acid (BTCA), and 0.20 grams of citric acid (CA) was added to a dry 2000 ml kettle equipped with s stirrer and nitrogen purge. A mixture of NMP and aromatic hydrocarbon solvent was added to the kettle in order to make a reaction solution of about 38-40% concentration. It has been observed that a concentration of the reaction mixture lower than about 35-45% may prolong the reaction time, and/or may result in the insensitivity of the solution viscosity at the end point. It has also been observed that a reaction concentration higher than about 45% may result in either fast reaction or insufficient time to detect the reaction end point as determined by a FTIR spectroscopy. A trace or small amount of versar wax was also added. The reaction was first carried out at 70-95° C. and then at 130-150° C. for total of 4-6 hours in a two-stage reaction. The reaction was quenched with a mixture of NMP and aromatic hydrocarbon at the end point, which was determined by a FTIR spectroscopy. The solids and viscosity of the resultant enamel were 31% and 1900 cps at 100° F., respectively.

An 18-gauge copper wire sample was made with precoated THEIC-based polyester and then overcoated with this branched polyamideimide. The ratio of the two coats was about 80% of basecoat to 20% of topcoat. The properties of the resultant magnet wire are shown in Table 1.

Examples 4-21 were prepared according to this general procedure described in Example 3, using different or different amounts of the star-structured or multifunctional component, and/or additional ingredients, such as the fillers described herein, as indicated below. When the varied amounts of the star-structured or multifunctional component were employed, the amounts of dicarboxylic acid were correspondingly changed to make the reaction system stoichiometrically balanced.

Example 4

A mixture of 270.5 g of MDI and 185 g of TMA, 5.5 g of AA, 11.5 g of IPA, 0.8 grams of BTCA, and 0.20 grams of citric acid (CA) was added to a 2000 ml kettle. A mixture of NMP and aromatic solvent was also added to the kettle in order to make a reaction solution of approximately 35-38% concentration. A trace amount of versar wax was also added. The reaction was carried out at 70-150° C. for 4-6 hours in a two-stage reaction as described above. The reaction was quenched with a mixture of NMP and aromatic solvent at the reaction end point, as determined by FTIR. The solids and viscosity of the resultant enamel were 29.7% and 1500 cps at 100° F., respectively. The film formed at 200° C. for an hour was flexible and tough.

An 18-gauge copper wire sample was made with precoated THEIC-based polyester and then overcoated with this branched polyamideimide. The ratio of the two coats was about 80% of basecoat to 20% of topcoat. The properties of the resultant magnet wire are shown in Table 1.

Example 5

A mixture of 270.5 g of MDI, 185 g of TMA, 5.5 g of AA, 11.5 g of IPA, and 1.0 grams of BTCA was added to a 2000 ml kettle. A mixture of NMP and aromatic solvent was also added to the kettle in order to make a reaction solution of approximately 35-38% concentration. A trace amount of versar wax was also added. The reaction was carried out at 70-150° C. for 4-6 hours in a two-stage reaction as described above. The reaction was quenched with a mixture of NMP and aromatic solvent at the reaction end point, as determined by FTIR. The solids and viscosity of the resultant enamel were 30% and 2000 cps at 100° F., respectively. The film formed at 200° C. for an hour was flexible and tough.

An 18-gauge copper wire sample was made with precoated THEIC-based polyester and then overcoated with this branched polyamideimide. The ratio of the two coats was about 80% of basecoat to 20% of topcoat. The properties of the resultant magnet wire are shown in Table 1.

Example 6

A mixture of 270.5 g of MDI, 185 g of TMA, 4.5 g of AA, 11.5 g of IPA, and 1.5 grams of BTCA was added to a 2000 ml kettle. A mixture of NMP and aromatic solvent were added to the kettle in order to make a reaction solution of approximately 35-38% concentration. A trace amount of versar wax was also added. The reaction was carried out at 70-150° C. for 4-6 hours in a two-stage reaction as described above. The reaction was quenched with a mixture of NMP and aromatic solvent at the end point, which was determined by FTIR. The solids and viscosity of the resultant enamel were 28% and 1450 cps at 100° F., respectively. The film formed at 200° C. for an hour was flexible and tough.

An 18-gauge copper wire sample was made with precoated THEIC-based polyester and then overcoated with this branched polyamideimide. The ratio of the two coats was about 80% of basecoat to 20% of topcoat. The properties of the resultant magnet wire are shown in Table 1.

Example 7

A mixture of 270.5 g of MDI, 185 g of TMA, 4.0 g of AA, 11.5 g of IPA, and 2.5 g BTCA was added to a 2000 ml kettle. A mixture of NMP and aromatic solvent was also added to the kettle in order to make a reaction solution of approximately 35-38% concentration. A trace amount of versar wax was also added. The reaction was carried out at 70-150° C. for 4-6 hours in a two-stage reaction as described above. The reaction was quenched with a mixture of NMP and aromatic solvent at the reaction end point, which was determined by FTIR. The solids and viscosity of the resultant enamel were 29% and 1450 cps at 100° F., respectively. The film formed at 200° C. for an hour was flexible and tough.

An 18-gauge copper wire sample was made with precoated THEIC-based polyester and then overcoated with this branched polyamideimide. The ratio of the two coats was about 80% of basecoat to 20% of topcoat. The properties of the resultant magnet wire are shown in Table 1.

Example 8

A mixture of 270.5 g of MDI, 185 g of TMA, 4.0 g of AA, 11.5 g of IPA, and 4.0 g BTCA was added to a 2000 ml kettle. A mixture of NMP and aromatic solvent was also added to the kettle in order to make a reaction solution of approximately 35-38% concentration. A trace amount of versar wax was also added. The reaction was carried out at 70-150° C. for 4-6 hours in a two-stage reaction as described above. The reaction was quenched with a mixture of NMP and aromatic solvent at the reaction end point, which was determined by FTIR. The solids and viscosity of the resultant enamel were 30% and 1850 cps at 100° F., respectively. The film formed at 200° C. for an hour was flexible and tough.

An 18-gauge copper wire sample was made with precoated THEIC-based polyester and then overcoated with this branched polyamideimide. The ratio of the two coats was about 80% of basecoat to 20% of topcoat. The properties of the resultant magnet wire are shown in Table 1.

Example 9

A mixture of 270.5 g of MDI, 185 g of TMA, 4.0 g of AA, 8.5 g of IPA and 5.5 g BTCA was added to a 2000 ml kettle. A mixture of NMP and aromatic solvent was also added to the kettle in order to make a reaction solution of approximately 35-38% concentration. A trace amount of versar wax was also added. The reaction was carried out at 70-150° C. for 4-6 hours in a two-stage reaction as described above. The reaction was quenched with a mixture of NMP and aromatic solvent at the reaction end point, which was determined by FTIR. The solids and viscosity of the resultant enamel were 30% and 1400 cps at 100° F., respectively. The film formed at 200° C. for an hour was flexible and tough.

An 18-gauge copper wire sample was made with precoated THEIC-based polyester and then overcoated with this branched polyamideimide. The ratio of the two coats was about 80% of basecoat to 20% of topcoat. The properties of the resultant magnet wire are shown in Table 1.

Example 10

A mixture of 270.5 g of MDI, 185 g of TMA, 4.5 g of AA, 11.5 g of IPA, 0.7 g BTCA, and 0.7 g of isocyanuric acid (ICA) was added to a 2000 ml kettle. A mixture of NMP and aromatic solvent was also added to the kettle in order to make a reaction solution of approximately 35-38% concentration. A trace amount of versar wax was also added. The reaction was carried out at 70-150° C. for 4-6 hours in a two-stage reaction as described above. The reaction was quenched with a mixture of NMP and aromatic solvent at the reaction end point, which was determined by FTIR. The solids and viscosity of the resultant enamel were 29% and 1900 cps at 100° F., respectively. The film formed at 200° C. for an hour was flexible and tough.

An 18-gauge copper wire sample was made with precoated THEIC-based polyester and then overcoated with this branched polyamideimide. The ratio of the two coats was about 80% of basecoat to 20% of topcoat. The properties of the resultant magnet wire are shown in Table 1.

Example 11

A mixture of 270.5 g of MDI, 185 g of TMA, 4.0 g of AA, 11.5 g of IPA, and 1.1 g of ICA was added to a 2000 ml kettle. A mixture of NMP and aromatic solvent was also added to the kettle in order to make a reaction solution of approximately 35-38% concentration. A trace amount of versar wax was also added. The reaction was carried out at 70-150° C. for 4-6 hours in a two-stage reaction as described above. The reaction was quenched with a mixture of NMP and aromatic solvent at the reaction end point, which was determined by FTIR. The solids and viscosity of the resultant enamel were 29.4% and 1875 cps at 100° F., respectively. The film formed at 200° C. for an hour was flexible and tough.

An 18-gauge copper wire sample was made with precoated THEIC-based polyester and then overcoated with this branched polyamideimide. The ratio of the two coats was about 80% of basecoat to 20% of topcoat. The properties of the resultant magnet wire are shown in Table 1.

Example 12

A mixture of 270.5 g of MDI, 185 g of TMA, 4.0 g of AA, 11.5 g of IPA, and 2.5 g of ICA was added to a 2000 ml kettle. A mixture of NMP and aromatic solvent was also added to the kettle in order to make a reaction solution of approximately 35-38% concentration. A trace amount of versar wax was also added. The reaction was carried out at 70-150° C. for 4-6 hours in a two-stage reaction as described above. The reaction was quenched with a mixture of NMP and aromatic solvent at the reaction end point, which was determined by FTIR. The solids and viscosity of the resultant enamel were 28% and 1385 cps at 100° F., respectively. The film formed at 200° C. for an hour was flexible and tough.

An 18-gauge copper wire sample was made with precoated THEIC-based polyester and then overcoated with this branched polyamideimide. The ratio of the two coats was about 80% of basecoat to 20% of topcoat. The properties of the resultant magnet wire are shown in Table 1.

Example 13

A mixture of 270.5 g of MDI, 185 g of TMA, 5.5 g of AA, 7.0 g of IPA, and 3.0 g of ICA was added to a 2000 ml kettle. A mixture of NMP and aromatic solvent was also added to the kettle in order to make a reaction solution of approximately 35-38% concentration. A trace amount of versar wax was also added. The reaction was carried out at 70-150° C. for 4-6 hours in a two-stage reaction as described above. The reaction was quenched with a mixture of NMP and aromatic solvent at the reaction end point, which was determined by FTIR. The solids and viscosity of the resultant enamel were 26.5% and 1475 cps at 100° F., respectively. The film formed at 200° C. for an hour was flexible and tough.

An 18-gauge copper wire sample was made with precoated THEIC-based polyester and then overcoated with this branched polyamideimide. The ratio of the two coats was about 80% of basecoat to 20% of topcoat. The properties of the resultant magnet wire are shown in Table 1.

Example 14

A mixture of 270.5 g of MDI, 185 g of TMA, 4.5 g of AA, 11.5 g of IPA, and 1.0 g of citric acid (CA) was added to a 2000 ml kettle. A mixture of NMP and aromatic solvent was also added to the kettle in order to make a reaction solution of approximately 35-38% concentration. A trace amount of versar wax was also added. The reaction was carried out at 70-150° C. for 4-6 hours in a two-stage reaction as described above. The reaction was quenched with a mixture of NMP and aromatic solvent at the reaction end point, which was determined by FTIR. The solids and viscosity of the resultant enamel were 31.5% and 1250 cps at 100° F., respectively. The film formed at 200° C. for an hour was flexible and tough.

An 18-gauge copper wire sample was made with precoated THEIC-based polyester and then overcoated with this branched polyamideimide. The ratio of the two coats was about 80% of basecoat to 20% of topcoat. The properties of the resultant magnet wire are shown in Table 1.

Example 15

A mixture of 270.5 g of MDI, 185 g of TMA, 3.5 g of AA, 11.5 g of IPA, and 1.5 g of CA was added to a 2000 ml kettle. A mixture of NMP and aromatic solvent was also added to the kettle in order to make a reaction solution of approximately 35-38% concentration. A trace amount of versar wax was also added. The reaction was carried out at 70-150° C. for 4-6 hours in a two-stage reaction as described above. The reaction was quenched with a mixture of NMP and aromatic solvent at the reaction end point, which was determined by FTIR. The solids and viscosity of the resultant enamel were 29.2% and 1750 cps at 100° F., respectively. The film formed at 200° C. for an hour was flexible and tough.

An 18-gauge copper wire sample was made with precoated THEIC-based polyester and then overcoated with this branched polyamideimide. The ratio of the two coats was about 80% of basecoat to 20% of topcoat. The properties of the resultant magnet wire are shown in Table 1.

Example 16

A mixture of 270.5 g of MDI, 185 g of TMA, 3.0 g of AA, 11.5 g of IPA, and 2.0 g of CA was added to a 2000 ml kettle. A mixture of NMP and aromatic solvent was also added to the kettle in order to make a reaction solution of approximately 35-38% concentration. A trace amount of versar wax was also added. The reaction was carried out at 70-150° C. for 4-6 hours in a two-stage reaction as described above. The reaction was quenched with a mixture of NMP and aromatic solvent at the reaction end point, which was determined by FTIR. The solids and viscosity of the resultant enamel were 32% and 1450 cps at 100° F., respectively. The film formed at 200° C. for an hour was flexible and tough.

An 18-gauge copper wire sample was made with precoated THEIC-based polyester and then overcoated with this branched polyamideimide. The ratio of the two coats was about 80% of basecoat to 20% of topcoat. The properties of the resultant magnet wire are shown in Table 1.

Example 17

A mixture of 270.5 g of MDI, 185 g of TMA, 5.5 g of AA, 11.5 g of IPA, and 2.5 g of CA was added to a 2000 ml kettle. A mixture of NMP and aromatic solvent was also added to the kettle in order to make a reaction solution of approximately 35-38% concentration. A trace amount of versar wax was also added. The reaction was carried out at 70-150° C. for 4-6 hours in a two-stage reaction as described above. The reaction was quenched with a mixture of NMP and aromatic solvent at the reaction end point, which was determined by FTIR. The solids and viscosity of the resultant enamel were 29% and 1550 cps at 100° F., respectively. The film formed at 200° C. for an hour was flexible and tough.

An 18-gauge copper wire sample was made with precoated THEIC-based polyester and then overcoated with this branched polyamideimide. The ratio of the two coats was about 80% of basecoat to 20% of topcoat. The properties of the resultant magnet wire are shown in Table 1.

Example 18

A mixture of 270.5 g of MDI, 185 g of TMA, 2.0 g of AA, 11.5 g of IPA, and 3.0 g of CA was added to a 2000 ml kettle. A mixture of NMP and aromatic solvent was also added to the kettle in order to make a reaction solution of approximately 35-38% concentration. A trace amount of versar wax was also added. The reaction was carried out at 70-150° C. for 4-6 hours in a two-stage reaction as described above. The reaction was quenched with a mixture of NMP and aromatic solvent at the reaction end point, which was determined by FTIR. The solids and viscosity of the resultant enamel were 30.4% and 1425 cps at 100° F., respectively. The film formed at 200° C. for an hour was flexible and tough.

An 18-gauge copper wire sample was made with precoated THEIC-based polyester and then overcoated with this branched polyamideimide. The ratio of the two coats was about 80% of basecoat to 20% of topcoat. The properties of the resultant magnet wire are shown in Table 1.

Example 19

A mixture of 270.5 g of MDI, 185 g of TMA, 0.5 g of AA, 11.5 g of IPA, and 4.0 g of CA was added to a 2000 ml kettle. A mixture of NMP and aromatic solvent was also added to the kettle in order to make a reaction solution of approximately 35-38% concentration. A trace amount of versar wax was also added. The reaction was carried out at 70-150° C. for 4-6 hours in a two-stage reaction as described above. The reaction was quenched with a mixture of NMP and aromatic solvent at the reaction end point, which was determined by FTIR. The solids and viscosity of the resultant enamel were 28.5% and 1400 cps at 100° F., respectively. The film formed at 200° C. for an hour was flexible and tough.

An 18-gauge copper wire sample was made with precoated THEIC-based polyester and then overcoated with this branched polyamideimide. The ratio of the two coats was about 80% of basecoat to 20% of topcoat. The properties of the resultant magnet wire are shown in Table 1.

Example 20

A mixture of 270.5 g of MDI, 185 g of TMA, 10.0 g of IPA, and 5.0 g of CA was added to a 2000 ml kettle. A mixture of NMP and aromatic solvent was also added to the kettle in order to make a reaction solution of approximately 35-38% concentration. A trace amount of versar wax was also added. The reaction was carried out at 70-150° C. for 4-6 hours in a two-stage reaction as described above. The reaction was quenched with a mixture of NMP and aromatic solvent at the reaction end point, which was determined by FTIR. The solids and viscosity of the resultant enamel were 29.5% and 1800 cps at 100° F., respectively. The film formed at 200° C. for an hour was brittle.

An 18-gauge copper wire sample was made with precoated THEIC-based polyester and then overcoated with this branched polyamideimide. The ratio of the two coats was about 80% of basecoat to 20% of topcoat. The properties of the resultant magnet wire are shown in Table 1.

Example 21

A mixture of 270.5 g of MDI, 185 g of TMA, 5.0 g of IPA, and 8.5 g of CA was added to a 2000 ml kettle. A mixture of NMP and aromatic solvent was also added to the kettle in order to make a reaction solution of approximately 35-38% concentration. A trace amount of versar wax was also added. The reaction was carried out at 70-150° C. for 4-6 hours in a two-stage reaction as described above. The reaction was quenched with a mixture of NMP and aromatic solvent at the reaction end point, which was determined by FTIR. The solids and viscosity of the resultant enamel were 32.7% and 11675 cps at 100° F., respectively. The film formed at 200° C. for an hour was brittle.

An 18-gauge copper wire sample was made with precoated THEIC-based polyester and then overcoated with this branched polyamideimide. The ratio of the two coats was about 80% of basecoat to 20% of topcoat. The properties of the resultant magnet wire are shown in Table 1.

Example 22

Repeated Scrape Test

The repeated scrape test is a conventional measure of abrasion resistance for wire coatings. The repeated scrape test consists of a test wire suspended adjacent a pendulum having a needle attached at the end thereof. The needle swings back and forth scraping the coating on the periphery of the wire. A defined loading is applied to the pendulum providing a controlled force to the needle against the wire. For the working examples described herein, the control and test wires were tested under a 700-gram load pendulum scraper for an 18 gauge (1 mm diameter) copper wire. The number of strokes (repeated scrape) it took the scraper to wear through the coatings was recorded. A greater number of strokes before failure indicated a more abrasion resistant coating. Coated wire samples prepared according to Examples 1-20 were tested and the results are indicated in Table 1.

Example 23

Unidirectional Scrape Test

The unidirectional scrape test is a standard NEMA testing procedure that determines the mar or scrape resistance of coated wires. For an eighteen gauge copper wire, the test probe is equipped with a 1200 gram-loaded fine steel string (piano string) by which coated wire samples are scraped. The test probe automatically scrapes along wire surfaces until the string cuts into the bare copper wire surface. The total distance traveled by the string is recorded, and the unidirectional scrape number is obtained as the total distance in multiples of the load of 1200 grams. Longer total distances traveled by the string, and heavier loads placed on the string mean better scrape resistance of coated wire samples. Coated wire samples prepared according to Examples 1-20 were tested and the results are indicated in Table 1.

Example 24

Mandrel Flexibility Test

The mandrel flexibility test is a standard NEMA test procedure designed to determine the coiling flexibility of a coated wire. A coated wire sample is automatically elongated to a break point. The wire sample is coiled onto a 1× mandrel. The insulated film integrity of the sample is examined using optical microscopy. If the film cracks to the bare copper, it is characterized as "failure to pass the test." If the film does not crack or only has topcoat cracks (tccs), it passes the test. A standard NEMA pass only requires 20% elongation and 1× Mandrel Flex. A typical eighteen-gauge copper wire sample made in the USA has a break point of about 35-44%. Coated wire samples prepared according to Examples 1-20 were tested and the results are indicated in Table 1.

Example 25

Heat Shock Test

The heat shock test is a standard NEMA test procedure designed to determine the coiling flexibility after a high temperature treatment. The coated wire sample is elongated 20% before it is coiled onto a 3× mandrel. The sample is then placed in a 240° C. oven for 0.5 hour before it is examined for the presence of film cracks under an optical microscope. Coated wire samples prepared according to Examples 1-20 were tested and the results are indicated in Table 1.

Example 26

Moisture Resistance Test

The moisture resistance test follows the ASTM water absorption test protocol as described in D470. The coated wire sample is immersed in de-ionized water at 38° C. for 1 day and 7 days. The sample is removed and wire surfaces are wiped gently with paper tissue. The wire sample is placed in an Attenuated Total Reflection device attached to an FTIR microspectroscopy to determine the relative water concentration that has penetrated in the film. Coated wire samples prepared according to Examples 1-20 were tested and the results are indicated in the following Table. The data shown in Table 1 are those for wire samples immersed for 7 days.

TABLE 1

Selected properties of coated wires.

| | Example No. | |
|---|---|---|
| | 1 (compare) | 2 (compare) |
| multifunctional component | none | none |
| amount (g) | 0 | 0 |
| Solids % | 28 | 27 |
| Viscosity | 2000 | 1850 |
| Insulation Build (mil) | 3.1 | 3.1 |
| Unidirectional Scrape | 1456 | 1484 |
| Mandrel Flex (1×) | Pass | Pass |
| | 41% | 41% tcc |
| Heat shock 240° C. 20% 3× | Pass | Pass |
| Tg° C. PES/b-PAI | 154/230 | 157/242 |
| Repeated Scrape (number of strokes) | 70 | 217 |
| Dielectric Breakdown (kV) | 15.0 | 14.5 |
| Dynamic C of F | 0.158 | 0.152 |
| Moisture Resistance Rel. conc. | 0.85 | 0.57 |

| | Example No. | |
|---|---|---|
| | 3 | 4 |
| multifunctional component | BTCA/CA | BTCA/CA |
| amount (g) | 0.8/0.2 | 0.8/0.2 |
| Solids % | 31 | 29.7 |
| Viscosity | 1900 | 1500 |
| Insulation Build (mil) | 3.2 | 3.2 |
| Unidirectional Scrape | 1748 | 1800 |
| Mandrel Flex (1×) | Pass | Pass |
| | 35% tcc | 35% tcc |
| Heat shock 240° C. 20% 3× | Pass | Pass |
| | tcc | tcc |
| Tg° C. PES/s-PAI | 158/243 | 159/249 |
| Repeated Scrape | 224 | 283 |
| Dielectric Breakdown (kV) | 13.8 | 14.0 |
| Dynamic C of F | 0.134 | 0.151 |
| Moisture Resistance Rel. conc. | 0.06 | 0.25 |

| | Example No. | | | | |
|---|---|---|---|---|---|
| | 5 | 6 | 7 | 8 | 9 |
| multifunctional component | BTCA | BTCA | BTCA | BTCA | BTCA |
| amount (g) | 1 | 1.5 | 2.5 | 4 | 5 |
| Solids % | 30 | 27.9 | 29 | 30 | 30 |
| Viscosity | 2000 | 1450 | 1450 | 1850 | 1400 |
| Insulation Build (mil) | 3.1–3.2 | 3.1–3.2 | 3.1–3.2 | 3.1–3.2 | 3.2 |
| Unidirectional Scrape | 1664 | 1692 | 1632 | 1716 | 1800 |
| Mandrel Flex (1×) | Pass | Pass | Pass | Pass | Pass |
| | 35% tcc | 35% tcc | 35% tcc | 35% tcc | 35% tcc |

TABLE 1-continued

Selected properties of coated wires.

| | | | | | |
|---|---|---|---|---|---|
| Heat shock 240° C. 20% 3× | Pass | Pass | Pass | Pass tcc | Pass tcc |
| Tg° C. PES/s-PAI | 159/241 | 157/240 | 158/242 | 159/245 | 155/240 |
| Repeated Scrape | 246 | 190 | 194 | 255 | 215 |
| Dielectric Breakdown (kV) | 14.4 | 15.5 | 15.4 | 15.0 | 14.2 |
| Dynamic C of F | 0.148 | 0.160 | 0.164 | 0.160 | 0.168 |
| Moisture Resistance Rel. conc. | 0 | 0 | 0 | 0 | 0.42 |

| | Example No. | | | |
|---|---|---|---|---|
| | 10 | 11 | 12 | 13 |
| multifunctional component | ICA/BTCA | ICA | ICA | ICA |
| amount (g) | 0.7/0.7 | 1.1 | 2.5 | 3 |
| Solids % | 29 | 29.4 | 28 | 26.5 |
| Viscosity | 1900 | 1850 | 1385 | 1475 |
| Insulation Build (mil) | 3.2–3.3 | 3.2–3.3 | 3.2–3.3 | 3.2–3.3 |
| Unidirectional Scrape | 1960 | 1720 | 1840 | 1940 |
| Mandrel Flex (1×) | Pass 43% tcc | Pass 42% tcc | Pass 42% tcc | Pass 42% tcc |
| Heat shock 240° C. 20% 3× | Pass tcc | Pass tcc | Pass | Pass tcc |
| Tg° C. PES/s-PAI | 158/241 | 159/245 | 159/243 | 159/241 |
| Repeated Scrape | 270 | 333 | 246 | 249 |
| Dielectric Breakdown (kV) | 13.2 | 11.7 | 13.9 | 15.2 |
| Dynamic C of F | 0.151 | 0.137 | 0.140 | 0.160 |
| Moisture Resistance ($H_2O$ relative concentration) | 0 | 0 | 0 | 0.2 |

| | Example No. | | | |
|---|---|---|---|---|
| | 14 | 15 | 16 | 17 |
| multifunctional component | CA | CA | CA | CA |
| amount (g) | 1 | 1.5 | 2 | 2.5 |
| Solids % | 31.5 | 29.2 | 32 | 29 |
| Viscosity | 1250 | 1575 | 1450 | 1550 |
| Insulation Build (mil) | 3.2 | 3.2–3.3 | 3.2–3.3 | 3.2 |
| Unidirectional Scrape | 1672 | 1820 | 1820 | 1680 |
| Mandrel Flex (1×) | Pass 35% | Pass 40% tcc | Pass 40% tcc | Pass 43% atcc |
| Heat shock 240° C. 20% 3× | Pass | Pass | Pass | Pass |
| Tg° C. PES/s-PAI | 157/241 | 158/237 | 157/243 | 157.2/235 |
| Repeated Scrape | 255 | 264 | 425 | 340 |
| Dielectric Breakdown (kV) | 14.1 | 13.0 | 13.5 | 14.4 |
| Dynamic C of F | 0.147 | 0.165 | 0.144 | 0.142 |
| Moisture Resistance ($H_2O$ relative concentration) | 0.11 | 0 | 0 | 0 |

| | Example No. | | | |
|---|---|---|---|---|
| | 18 | 19 | 20 | 21 |
| multifunctional component | CA | CA | CA | CA |
| amount (g) | 3 | 4 | 5 | 8.5 |
| Solids % | 30.4 | 28.5 | 29.5 | 32.7 |
| Viscosity | 1425 | 1400 | 1800 | 1675 |
| Insulation Build (mil) | 3.2 | 3.2 | 3.3 | |
| Unidirectional Scrape | 1764 | 1776 | | |
| Mandrel Flex (1×) | Pass 35% tcc | Pass 35% tcc | | |
| Heat shock 240° C. 20% 3× | Pass tcc | Pass tcc | | |
| Tg° C. PES/s-PAI | 159/243 | 158/245 | | |
| Repeated Scrape | 278 | 304 | | |
| Dielectric Breakdown (kV) | 13.7 | 13.0 | | |
| Dynamic C of F | 0.159 | 0.147 | | |
| Moisture Resistance ($H_2O$ relative concentration) | 0 | 0 | | |

What is claimed is:

1. A process for preparing a coating composition consisting of the steps of:
   (i) providing a mixture consisting of (a) trimellictic anhydride (TMA); (b) diphenylmethane 4,4-diisocyanate (MDI); (c) isophthalic acid (IPA), adipic acid (AA), or isocyanuric acid (ICA); and (d) a solvent;
   (ii) reacting the mixture at a first temperature for a first predetermined period of time; and
   (iii) reacting the mixture at a second temperature for a second predetermined period of time, where the second temperature is higher than the first temperature.

2. The process of claim 1 wherein the first temperature is in the range from about 60° C. to about 100° C.

3. The process of claim 1 wherein the second temperature is in the range from about 120° C. to about 160° C.

4. The process of claim 1, wherein the first predetermined period of time is 3-4 hours.

5. The process of claim 1, wherein the second predetermined period of time is 1-2 hours.

6. The process of claim 1, wherein the solvent is selected from the group consisting of N-methylpyrrolidinone (NMP), N,N-dimethylacetamide, N,N-diethylacetamide, N,N,-dimethylformamide, N,N-diethylformamide, dimethylsulfoxide, diethylsulfoxide, sulfolane, tetramethylenesulphone, 1,1,3,3-tetramethylurea, 1,3-dimethylurea, hexamethylphosphoramide (HMPA), para xylene, meta xylene, ortho xylene, naphtha, heptane, hexane, and mixtures thereof.

* * * * *